United States Patent
Acker et al.

(10) Patent No.: US 7,080,880 B2
(45) Date of Patent: Jul. 25, 2006

(54) UPPER BODY SIDE PROTECTION DEVICE FOR A VEHICLE OCCUPANT AND VEHICLE SEAT

(75) Inventors: Dominique Acker, Gschwend (DE); Sven Hofmann, Schwäbisch Gmünd (DE); Jürgen Hirth, Gschwend (DE); Norbert Ellerbrok, Rudersberg (DE); Andreas Loos, Eislingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 390 days.

(21) Appl. No.: 10/616,345

(22) Filed: Jul. 9, 2003

(65) Prior Publication Data
US 2004/0007905 A1    Jan. 15, 2004

(30) Foreign Application Priority Data
Jul. 12, 2002   (DE) ................................ 102 31 631

(51) Int. Cl.
*B60N 2/42* (2006.01)

(52) U.S. Cl. ............................. 297/216.13; 280/730.2; 280/730.1

(58) Field of Classification Search ........... 297/216.13; 280/730.2 X, 728.1 X, 730.1 X
See application file for complete search history.

(56) References Cited

U.S. PATENT DOCUMENTS

| | | | |
|---|---|---|---|
| 3,731,949 A | | 5/1973 | Radke |
| 5,439,247 A | | 8/1995 | Kolb |
| 5,556,128 A | * | 9/1996 | Sinnhuber et al. ........ 280/730.2 |
| 5,615,909 A | | 4/1997 | Wipasuramonton et al. |
| 5,722,685 A | | 3/1998 | Eyrainer |
| 5,890,732 A | * | 4/1999 | Nakamura et al. .......... 280/729 |
| 5,913,536 A | | 6/1999 | Brown |
| 6,302,431 B1 | * | 10/2001 | Sasaki et al. ............. 280/728.2 |
| 6,685,219 B1 | * | 2/2004 | Yamaji et al. ............ 280/730.2 |
| 6,742,805 B1 | * | 6/2004 | Hill .......................... 280/730.2 |
| 2004/0021304 A1 | | 2/2004 | Tanase et al. |

FOREIGN PATENT DOCUMENTS

| | | |
|---|---|---|
| DE | 3833889 | 4/1990 |
| DE | 4232658 | 3/1994 |
| DE | 19704657 | 2/1997 |
| DE | 19605620 | 8/1997 |
| DE | 19930157 | 1/2001 |
| WO | 02/100691 | 12/2002 |

* cited by examiner

*Primary Examiner*—Laurie K. Cranmer
(74) *Attorney, Agent, or Firm*—Tarolli, SUndheim, Covell & Tummino LLP

(57) ABSTRACT

A vehicle seat has an upper body side protection device that is integrated in the back rest. The protection device comprises a gas bag which has an elongated, oval chamber via which, in the case of an intrusion, the force is introduced into the occupant principally in the region of the hip and the shoulder, in order to displace him in the direction towards the center of the vehicle.

9 Claims, 2 Drawing Sheets

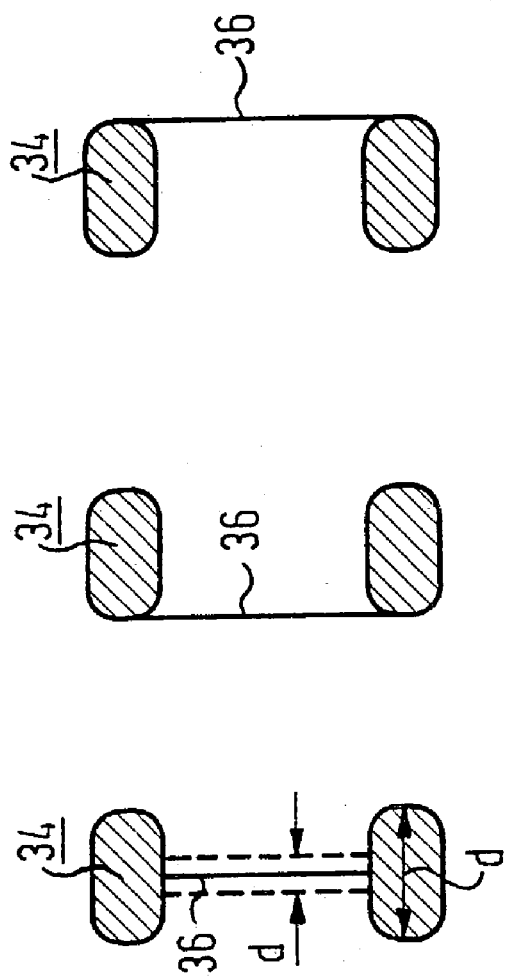
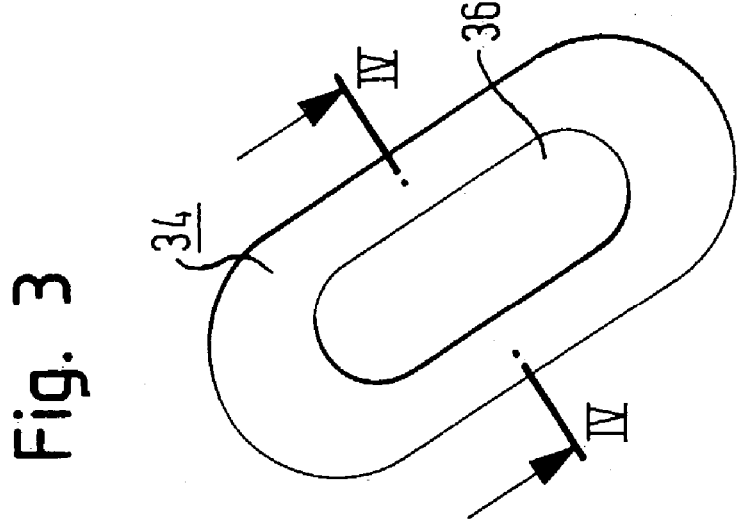

UPPER BODY SIDE PROTECTION DEVICE FOR A VEHICLE OCCUPANT AND VEHICLE SEAT

TECHNICAL FIELD

The invention relates to an upper body side protection device for an occupant of a vehicle equipped with a vehicle seat. In addition, the invention relates to a vehicle seat comprising such protection device.

BACKGROUND OF THE INVENTION

Such side protection devices are, for example, side gas bag systems with cushion-shaped gas bags integrated into the seat which normally has a seat surface and a back rest. On inflation, the gas bag pushes its way to between the upper body and the side wall. If the side wall or the door is deformed, the occupant is moved further apart from the deformed side wall or door by means of the gas bag.

The cushion-shaped gas bags have the effect that with a deformation of the side wall or of the door, the pressure thereby occurring is distributed uniformly onto the occupant.

The invention provides an upper body side protection device, which makes possible a rapid displacement of the occupant in the case of an intrusion.

BRIEF SUMMARY OF THE INVENTION

According to the invention, an upper body side protection device for an occupant of a vehicle which is equipped with a vehicle seat including a seat surface and a back rest. The protection device comprises a side gas bag extending to the side of said upper body. The side gas bag has a ring-shaped inflatable chamber which extends from the seat surface at the side of the upper body to at least close to an upper edge of the back rest and surrounds a central region of the gas bag. The central region in an inflated state of the gas bag has a smaller thickness than the inflatable chamber, measured horizontally and transversely to a longitudinal direction of said vehicle. In the region of the hip and shoulder (i.e. above the seat surface and in the region of the upper end of the back rest respectively), the ring-shaped chamber fills up the space between hip/shoulder and side wall door, respectively, and covers these parts of the body as completely as possible. In contrast to the thoracic and abdominal region, which is "soft" in lateral direction, the bones in the region of the hip and shoulder are very stable, so that the action of force on the occupant through the introduction of force takes place principally in these regions, whereby a rapid displacement is able to be achieved. In the central region, which is not inflatable or which has a small thickness, preferably the outermost rib areas are situated, into which less force is introduced. The upper body side gas bag is thereby adapted to the shape of the upper body in a specific fashion. A further advantage of the special upper body side gas bag lies in the small inflation volume. Already a volume of 8 to 10 l is sufficient to be able to develop the desired protection effect. Owing to this small volume, a very rapid inflation time is also able to be achieved. In addition, owing to the central region, high internal pressures of the gas bag are possible, because the gas bag does not bulge out in the center, in contrast to a cushion-shaped gas bag.

According to the preferred embodiment, the central region is even constructed so as not to be inflatable, by the gas bag fabric, for example, being separated from the chamber by a seam.

For optimum flow, the inflatable chamber is constructed so as to be closed peripherally to form a ring shape. According to a further embodiment, the inflatable chamber is oval in the inflated state, and its main direction of extent is substantially parallel to the back rest. The main direction of extent is the direction with the greatest expanse of the gas bag. The gas bag therefore covers the upper body, viewed laterally, from the hip to the shoulder.

In the side view of the installed, inflated gas bag, the chamber has an upper and a lower section. Each of these sections is wider than lateral sections which connect the upper and lower sections with each other. The greatest chamber volume is therefore provided in the region of the hip and the shoulder, whereas the lateral sections have a relatively small volume and extend almost linearly and laterally, i.e. close to the back and close to the chest and stomach, respectively, and along the thoracic and abdominal region.

According to the invention, provision can also be made that the gas bag when installed and inflated, as seen in side view, extends across a width of a maximum of approximately 300 mm parallel to the back rest upwards from the seat surface. The gas bag is preferably a relatively narrow, egg-shaped, upwardly extending structure.

The central region extends, beginning approximately 200 mm over the seat surface, up to a maximum of approximately 150 mm beneath the upper edge of the back rest. Preferably, the non-inflatable region has a length of 200 to 250 mm and a width of 80 to 120 mm.

Defined in more general terms, the side gas bag which is used in the invention is aligned such that the central region extends above the hip up to the-upper thoracic region of a "standardized" occupant in the form of a so-called EURO-SID No. 2 dummy or of an SI dummy II-S, customary in the USA. The chamber here runs from the hip to the shoulder of these dummies.

The invention further relates to a vehicle seat which has such an upper body side protection device integrated in the back rest.

BRIEF DESCRIPTION OF THE DRAWINGS

FIG. 3 shows a side view only of the side gas bag, which is illustrated in FIG. 1, in the inflated state, and FIGS. 4a to 4c show sectional views through the gas bag according to FIG. 3 along the line IV—IV in three different modifications.

DETAILED DESCRIPTION OF THE PREFERRED EMBODIMENTS

Figure 1:
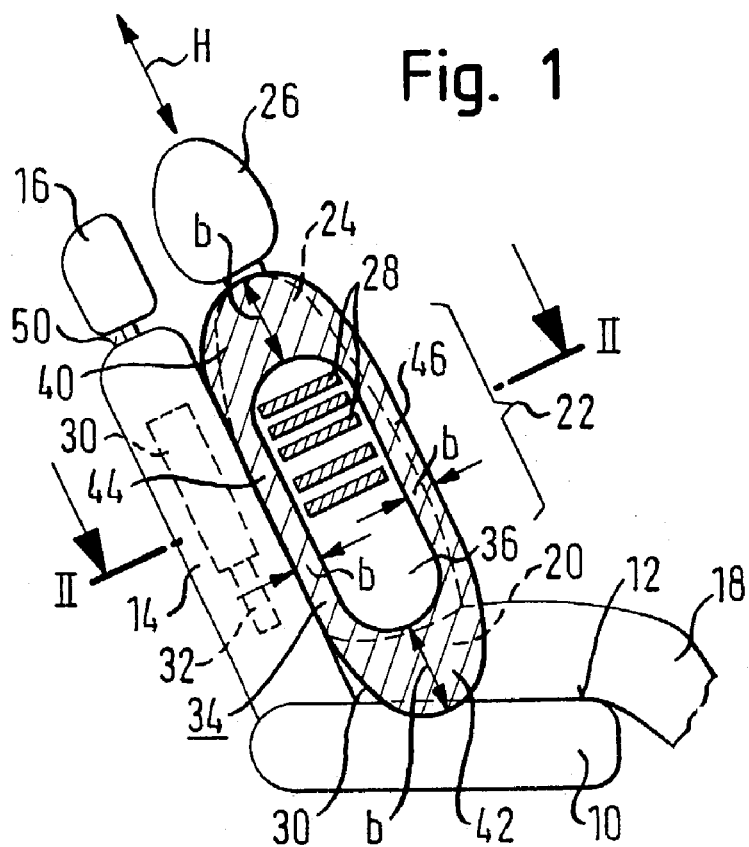
FIG. 1 shows a side view of the vehicle seat according to the invention, with integrated upper body side protection device according to the invention, together with a dummy.

FIG. 1 shows a vehicle seat with an integrated upper body side protection device. The vehicle seat comprises a seat pad 10 with a seat surface 12 (upper side of the seat pad 10), a back rest 14 and a headrest 16. In the embodiment illustrated, a dummy is positioned on the seat, more precisely a EUROSID No. 2 or SI dummy II-S. This type of dummies represents standardized dummies used in Europe and the USA, respectively, which are used as standard for side protection devices. The legs are designated by reference number 18, the hips 20, the thoracic- and abdominal region 22, the shoulders 24, the head 26 and the ribs 28.

Integrated into the back rest 14 is an upper body side protection device (illustrated in broken lines), which has a side gas bag 30 and a gas generator 32. The gas bag 30 is also illustrated in the inflated state, having a hatched chamber 34 which runs in an elongated, oval and ring-shaped form. The inflatable chamber 34 is closed peripherally in a ring shape and surrounds a central, non-inflatable region 36. The main direction of extent H of the chamber 34, i.e. its direction with the greatest expanse, extends substantially parallel to the back rest 14. In side view and in relation to the main direction of extent H, the chamber 34 has an upper and a lower section 40 and 42, respectively, which to the side cover the adjoining shoulder 24 and the hip 20, respectively, and also has two lateral, tube-shaped sections 44, 46, which connect the upper and lower sections 40, 42 with each other; the upper and lower sections 40, 42 have in lateral direction a greater width b than the lateral sections 44, 46. The gas bag 30 and its chamber 34 extend from the seat surface 12 upwards to at least close to the upper edge 50 (in the illustrated case even beyond the edge 50) of the back rest 14. Laterally, therefore, the entire upper body of the occupant is covered by the gas bag 30. The central region 36 begins above the hip 20 and extends across 200 to 250 mm along the main direction of extent H upwards to beneath the shoulders 24. The width of the central region amounts to approximately between 80 and 120 mm. The central region 36, as also shown in FIG. 2 and as seen in top view, is aligned to the central region of the abdomen and thorax of the occupant.

Preferred further dimensions of the gas bag: The central region begins approximately above 200 mm over the seat surface 12 and extends to a maximum up to approximately 150 mm beneath the upper edge 50 of the back rest. The maximum width of the inflated gas bag (measured transversely to the main direction of extent H) amounts to approximately 300 mm. The dimensions of the gas bag amount to approximately 700 mm×350 mm along or respectively transversely to the main direction of extent H in the non-inflated, unfolded state.

Figure 2:
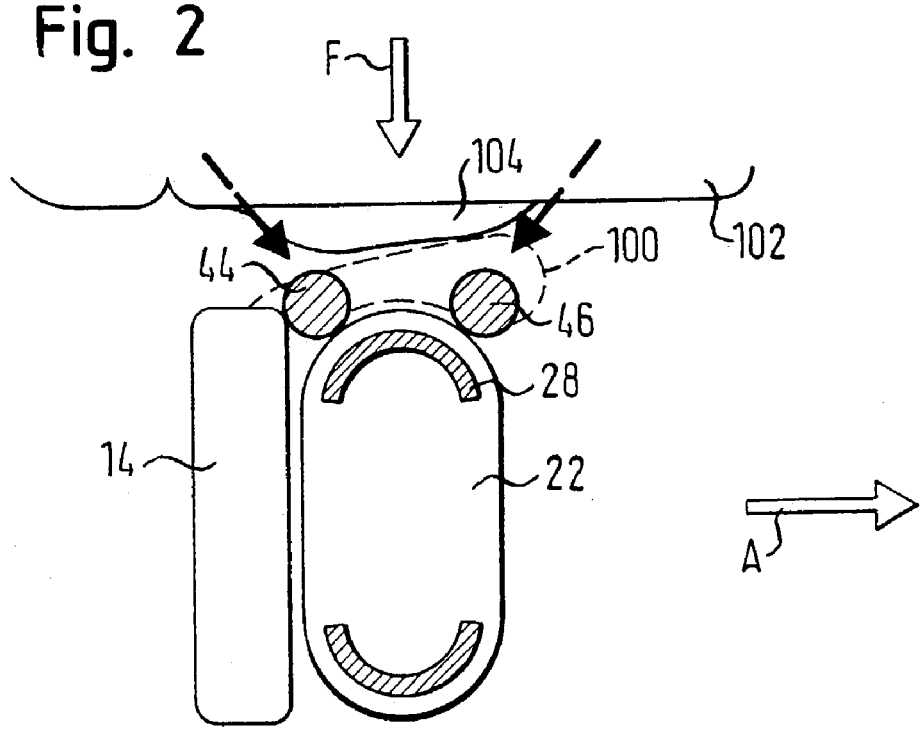
FIG. 2 shows a section through the vehicle seat together with protection device and the dummy along the line II—II according to FIG. 1.

In FIG. 2, a conventional cushion-shaped gas bag 100 is illustrated in broken lines, constructed without a ring-shaped chamber 34. Compared with the gas bag 30 used in the invention, this gas bag does not have a recess formed by the central region 36 and aligned to the abdominal- and thoracic region. The ring-shaped chamber with the lateral sections 44, 46, are positioned in the inflated state between the door lining 102 and the occupant, more precisely laterally and to the front of the back rest 14. The lateral sections 44, 46 lie at the front and rear end of the costal arch, whereas the central section of the costal arch is aligned to the non-inflatable region 36.

In the case of an intrusion of the side wall of the vehicle or a vehicle door in the case of a lateral impact, illustrated by the arrow F and the deformation 104 of the side wall of the vehicle or vehicle door, a lateral force is applied onto the gas bag, which the latter partially transfers to the occupant. The transfer of force to the occupant takes place principally in the upper and lower regions 40, 42, i.e. via the shoulder 24 adjoining the gas bag, and the pelvis 20. The occupant is, in addition, only stressed in the rear and front chest region, respectively, and in fact adapted to the rib geometry. The thoracic and abdominal regions are only slightly stressed.

Owing to the geometry of the gas bag, which has an inflation volume of only 8 to 10 l, and its ring-shaped chamber 34, the occupant can be moved in the case of an intrusion very quickly inwards transversely to the longitudinal direction A of the vehicle. The acceleration of the occupant in the region of shoulder 24 and pelvis 20 permits a relatively high pressure level in the ring-shaped chamber 23, owing to the biomechanics of an occupant.

In FIG. 3, the gas bag 30 is once again illustrated separately.

FIGS. 4a to 4c show various positions of the central region 36 relative to the inflated chamber 34. According to FIG. 4a, the central region, consisting of a central part of the gas bag fabric circumscribed by a seam, is positioned centrally to the chamber 34 as seen in section.

In the embodiment according to FIG. 4b, the central region 36 is arranged on the side of the chamber 34 facing the occupant. In the embodiment according to FIG. 4c, on the other hand, the central region 36 is situated on the side of the chamber 34 associated with the door or the side wall.

It is also to be emphasized that the central region 36 does not have to be a non-inflatable region. As illustrated in FIG. 4a by broken lines, the central region 36 could also be an inflatable region which, however, in cross-section and horizontally transversely to the longitudinal direction of the vehicle, has a distinctly smaller thickness d than the chamber 34, in order to achieve the introduction of force in the case of a lateral intrusion via pelvis and shoulder.

The invention claimed is:

1. An upper body side protection device for an occupant of a vehicle which is equipped with a vehicle seat including a seat surface and a back rest, said protection device comprising a side gas bag extending to the side of said upper body, said side gas bag having a ring-shaped inflatable chamber which extends from said seat surface at the side of said upper body to at least close to an upper edge of said back rest and surrounds a central region of said gas bag, said central region in an inflated state of said gas bag having a smaller thickness than said inflatable chamber, measured horizontally and transversely to a longitudinal direction of the vehicle, wherein said inflatable chamber is closed peripherally to form a ring shape.

2. The upper body side protection device according to claim 1, wherein said central region is constructed so as to be non-inflatable.

3. The upper body side protection device according to claim 1, wherein said inflatable chamber is oval in said inflated state, and a main direction of extent thereof is substantially parallel to said back rest.

4. The upper body side protection device according to claim 1, wherein said gas bag when installed and inflated, as seen in a side view, has upper and lower sections which are wider than lateral sections connecting said upper and lower sections.

5. The upper body side protection device according to claim 1, wherein said gas bag when installed and inflated, as seen in a side view, extends across a width of a maximum of approximately 300 mm parallel to said back rest from said seat surface upwards with respect to said back rest.

6. The upper body side protection device according to claim 1, wherein said central region begins above approximately 200 mm over said seat surface, in relation to said inflated state of said side gas bag, and extends to a maximum up to approximately 150 mm beneath said upper edge of said back rest.

7. A vehicle seat comprising an upper body side protection device for an occupant of a vehicle which is equipped with a vehicle seat including a seat surface and a back rest, said protection device comprising a side gas bag extending to the side of said upper body, said side gas bag having a ring-shaped inflatable chamber which extends from said seat surface at the side of said upper body to at least close to an upper edge of said back rest and surrounds a central region of said gas bag, said central region in an inflated state of said gas bag having a smaller thickness than said inflatable chamber, measured horizontally and transversely to a longitudinal direction of the vehicle, said protection device being integrated in said back rest, wherein said inflatable chamber is closed peripherally to form a ring shape, said inflatable chamber being oval in said inflated state, a main direction of extent of said chamber being substantially parallel to said back rest.

8. An upper body side protection device for an occupant of a vehicle which is equipped with a vehicle seat including a seat surface and a back rest, said protection device comprising a side gas bag extending to the side of said upper body, said side gas bag having a ring-shaped inflatable chamber which extends from said seat surface at the side of said upper body to at least close to an upper edge of said back rest and surrounds a central region of said gas bag, said central region in an inflated state of said gas bag having a smaller thickness than said inflatable chamber, measured horizontally and transversely to a longitudinal direction of the vehicle wherein said inflatable chamber is closed peripherally to form a ring shape, said inflatable chamber being oval in said inflated state, a main direction of extent of said chamber being substantially parallel to said back rest.

9. The upper body side protection device according to claim 9, wherein said upper body has a plurality of ribs, said central region covering said ribs.

* * * * *